United States Patent

Hirama et al.

[11] Patent Number: 5,574,324
[45] Date of Patent: Nov. 12, 1996

[54] ROTOR STRUCTURE OF ALTERNATING CURRENT GENERATOR FOR USE IN VEHICLE

[75] Inventors: Makoto Hirama; Kenji Ishihara, both of Hitachinaka; Susumu Sasaki, Naka-machi; Yoshiaki Honda, Hitachinaka, all of Japan

[73] Assignees: Hitachi, Ltd., Tokyo; Hitachi Automotive Engineering Co., Ltd., Ibaraki, both of Japan

[21] Appl. No.: 396,787

[22] Filed: Mar. 1, 1995

[30] Foreign Application Priority Data

Mar. 1, 1994 [JP] Japan .................................. 6-031098

[51] Int. Cl.⁶ .......................... H02K 1/04; H02K 15/00; H02K 1/22; H02K 21/00
[52] U.S. Cl. .......................... 310/194; 310/263; 310/42; 310/43
[58] Field of Search .................. 310/42, 43, 45, 310/51, 191, 193, 194, 214, 215, 263

[56] References Cited

U.S. PATENT DOCUMENTS

| | | | |
|---|---|---|---|
| 1,400,440 | 12/1921 | Karp | 310/89 |
| 2,795,715 | 6/1957 | Gilchrist | 310/261 |
| 4,114,056 | 9/1978 | Nimura | 310/42 |
| 4,228,377 | 10/1980 | Kreuzer | 310/263 |
| 4,307,314 | 12/1981 | Yamada et al. | 310/263 |
| 5,122,705 | 6/1992 | Kusase et al. | 310/68 |
| 5,254,896 | 10/1993 | Bradfield et al. | 310/263 |

FOREIGN PATENT DOCUMENTS

| | | |
|---|---|---|
| 58-182461 | 10/1983 | Japan . |
| 60-20763 | 2/1985 | Japan . |

Primary Examiner—Thomas M. Dougherty
Assistant Examiner—Michael Wallace
Attorney, Agent, or Firm—Antonelli, Terry, Stout & Kraus

[57] ABSTRACT

Plural thin plate projecting portions are integrally and projectingly provided on an outer peripheral portion of a side plate member of a bobbin. Each of the thin plate projecting portions comprises a circumferential rib, a slit portion and a reinforcement rib. The circumferential rib is provided on an outer peripheral face of the thin plate projecting portion of the bobbin and then a gap is formed between a claw-shaped magnetic pole of a rotor core and the thin plate projecting portion. A varnish material etc. is caused to adhere to and harden in this gap. By filling a root portion of the claw-shape magnetic pole of the rotor core with varnish material, the resonance vibration in the rotor core can be restrained. As a result, an alternating current generator for use in a vehicle having the small magnetic noise can be obtained.

12 Claims, 4 Drawing Sheets

1

ROTOR STRUCTURE OF ALTERNATING CURRENT GENERATOR FOR USE IN VEHICLE

BACKGROUND OF THE INVENTION

The present invention relates to a rotor structure of an alternating current generator for use in a vehicle; and, more particularly, to a rotor structure of an alternating current generator for use in an automobile in which the rotor structure has an improved insulating bobbin for insulating a field magnetic coil, suitable for use in an automobile.

In an alternating current generator for use in a vehicle, a need for obtaining a high output is increasing year by year; and also, in accordance with a directing desire for a higher quality alternating current generator by the end user, a requirement for reducing noise, such as magnetic noise generated in the alternating current generator, has become more important.

In a conventional rotor structure of an alternating current generator for use in a vehicle, a bobbin for insulating a rotor core from a field magnetic coil in the rotor structure of the alternating current generator for use in the vehicle is disclosed in, for example Japanese patent laid-open publication No. 20,763/1985.

Namely, in the above stated conventional rotor structure of the alternating current generator for use in a vehicle, a pressing portion is formed integrally with the bobbin. This pressing portion is inserted between an inner peripheral face of a claw-shaped magnetic pole of the rotor core and the field magnetic coil; and, accordingly, the resonance vibration generated on the claw-shaped magnetic pole of the rotor core is reduced.

Besides, another conventional rotor structure of an alternating current generator for use in a vehicle having a flexibility vibration attenuation member is disclosed in, for example, Japanese patent laid-open publication No. 182,461/1983.

This flexibility vibration attenuation member is made of an insulating material and is made to closely adhere to a portion between an outer peripheral face of a claw-shaped magnetic pole of a rotor core and an inner peripheral face of a field magnetic coil of the rotor structure of the alternating current generator.

In general, during the generation of the electric energy in the alternating current generator, it is well known that, in case an uneven air gap is formed between the rotor core and the stator core, the magnetic noise increases.

According to the above-stated former conventional technique, since the pressing portion is formed integrally with the bobbin, this pressing portion is inserted in full contact with the portion formed between the inner peripheral face of the claw-shaped magnetic pole of the rotor core and the field magnetic coil in the rotor structure of the alternating current generator.

Consequently, in a case where an adhesive material is used to further heighten the strength of the claw-shaped magnetic pole of the rotor core and the magnetic coil, there is a possibility that a varnish material, which works as an adhesive material, insufficiently impregnates into a root portion on the inner peripheral face of the claw-shaped magnetic pole of the rotor core. Accordingly, there is some doubt about the strength of adhesion of the claw-shaped magnetic pole of the rotor core with the magnetic coil.

Further, in the above stated latter conventional technique, the flexibility vibration attenuation member is caused to closely adhere to the portion formed between the inner peripheral face of the claw-shaped magnetic pole of the rotor core and the field magnetic coil in the rotor structure of the alternating current generator.

Thereby, even in a case where a hole portion or a cut-off portion is partially provided in the structure shown in the latter conventional technique, similar to the former conventional technique, there is a possibility that the varnish material, which works as an adhesive material, insufficiently impregnates into the root portion on the inner peripheral face of the claw-shaped magnetic pole of the rotor core in the rotor structure of the alternating current generator.

SUMMARY OF THE INVENTION

An object of the present invention is to provide a rotor of an alternating current generator for use in a vehicle, wherein the resonance vibration, which represents a main factor of the magnetic noise of a rotor core, can be restrained; and, as a result, the magnetic noise can be decreased.

The above stated object is attained by a rotor structure of an alternating current generator for use in a vehicle, which comprises a rotatively supported shaft, a pair of rotor cores fixed to and oppositely arranged on the shaft, each of the pair of rotor cores respectively having plural claw-shaped magnetic poles, a field magnetic coil sandwiched by the pair of rotor cores, and a bobbin made of a synthetic resin material for insulating the pair of rotor cores and the field magnetic coil, the bobbin comprising a cylindrical portion and two side plate members integrally formed with the cylindrical portion.

In the rotor structure of the alternating current generator, the bobbin comprises plural thin plate projecting portions provided integrally on an outer peripheral portion of each of the two side plate members; the plural thin plate projecting portions of the bobbin are arranged oppositely to the plural claw-shaped magnetic poles; and each of the plural thin plate projecting portions extends from a root portion of the plural claw-shaped magnetic poles of the pair of rotor cores toward a direction of a tip portion of the plural claw-shaped magnetic pole of the pair of rotor cores. The field magnetic coil and the bobbin adhere through an adhesive material to each other, and also the bobbin and the pair of rotor cores adhere through the adhesive material to each other.

Since the vanish material is hardened and adheres to the portions formed between the plural claw-shaped magnetic poles of the pair of rotor cores and the plural thin plate projecting portions of the bobbin, the resonance vibration of the plural claw-shaped magnetic poles of the rotor core can be restrained; and, as a result, any unevenness in the air gap between the pair of rotor cores and the stator core can be eliminated, so that the magnetic noise can be decreased.

A slit portion is formed on each of the plural thin plate projecting portions of the bobbin and divides each of the thin plate projecting portions of the bobbin into two parts, for example. This slit portion of the thin plate projecting portion of the bobbin can disperse the local stress caused by twist toward both parts of each of the plural thin plate projecting portions of the bobbin, the above stated twist being generated during the installation operation.

Accordingly, the occurrence of a crack and other damage to the plural thin plate projecting portions of the bobbin can be prevented; and further, the working property for installing the bobbin can be improved.

DESCRIPTION OF THE INVENTION

One embodiment of an alternating current generator for use in a vehicle in which a rotor structure according to the present invention is employed will be explained with reference to FIG. 1 to FIG. 7.

Figure 1:
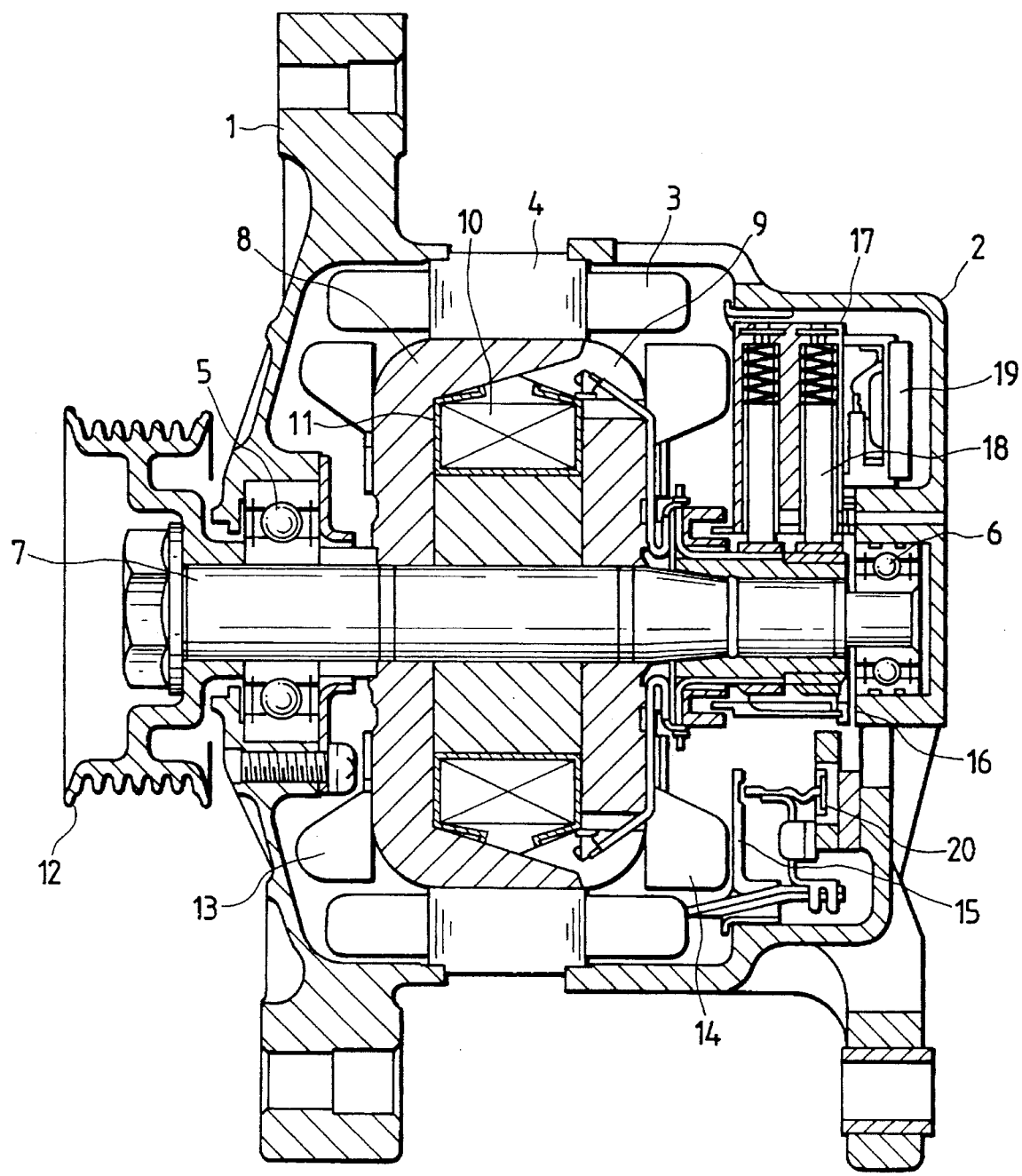
FIG. 1 is a cross-sectional view showing a structure of an alternating current generator for use in a vehicle in which a rotor structure according to the present invention is employed.

In FIG. 1, an alternating current generator having a rotor structure mainly comprises a pair of brackets 1 and 2, a three-phase stator coil 3 and a stator core 4. The stator core 4 has a three-phase stator coil 3 wound thereon. The pair of brackets 1 and 2 form an outer peripheral outline of the alternating current generator, and the two brackets 1 and 2 are squeezed and fixed to the stator core 4 through plural bolts (not shown in the figure).

In this alternating current generator, two cylindrical bearing boxes are formed on a central portion of the inner side faces of the above stated two brackets 1 and 2, these two bearing boxes being projected toward the inner sides of the alternating current generator. Each of bearing members 5 and 6 is installed on the respective left and right bearing boxes, and each of the bearing members 5 and 6 rotatively supports a shaft 7.

A pair of rotor cores 8 and 9 having claw-shaped magnetic poles 8a and 9a (FIG. 2) are fixed to the rotatively supported shaft 7 so as to be spaced by a minute gap (hereinafter, it is referred to as an "air gap") from an inner peripheral surface of the above stated stator core 4. The left side rotor core 8 has an even number (6) claw-shaped magnetic poles 8a and the right side rotor core 8 has even number (6) of claw-shaped magnetic poles 9a, thereby the pair of rotor cores 8 and 9 has the twelve (6+6=12) claw-shaped magnetic poles 8a and 9a.

Each of the claw-shaped magnetic poles 8a provided on the rotor core 8 is arranged respectively at a middle portion of the opposite adjacent two claw-shaped magnetic poles 9a provided on the rotor core 9.

The pair of rotor cores 8 and 9 sandwich a bobbin 11 and this bobbin 11 holds a field magnetic coil 10 at an interior portion thereof.

A pulley 12 is fixed at a tip end of the rotative shaft 7. Further, each of a pair of fans 13 and 14 is fixed to a respective outer side surface of the pair of rotor cores 8 and 9. A tip end of the fan 13 is oppositely arranged with respect to the inner side face of the bracket 1 through a gap and a tip end of the fan 14 is oppositely arranged with respect to the inner side face of a fan guide 15 through a gap. A tip end of the field magnetic coil 10 is electrically connected to a slip ring 16 and this slip ring 16 is fixed to the rotative shaft 7.

A brush member 18 is supported by a brush holder 17 and this brush member 18 is in contact with the slip ring 16 under spring pressure. In accompaniment with the above stated brush holder 17, a regulator 19 for controlling an output voltage at a constant level and a diode bridge 20 for full-wave rectifying an output current of the stator coil 3 are respectively installed on the interior portion of the bracket 2.

The rotor structure according to the present invention is mainly concerned with the rotatively supported shaft 7, the pair of rotor cores 8 and 9, the field magnetic coil 10, and the bobbin 11.

The bobbin 11 is made of a synthetic resin material, such as a nylon material and is fixed to form one component in the above stated rotor structure. This bobbin 11 is sandwiched by the pair of rotor cores 8 and 9, and each of the pair of rotor cores 8 and 9 is respectively fixed to the rotative shaft 7. The bobbin 11 is arranged to stand in a row and protects the field magnetic coil 10.

Figure 3:
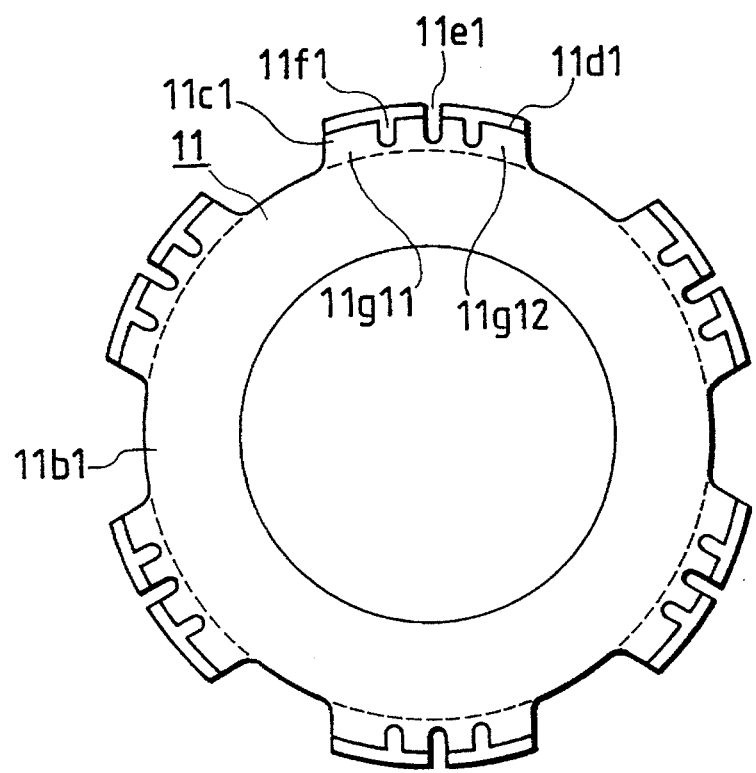
FIG. 3 is an enlarged front view showing a left side plate member of a bobbin, before the installation of the bobbin.
Figure 4:
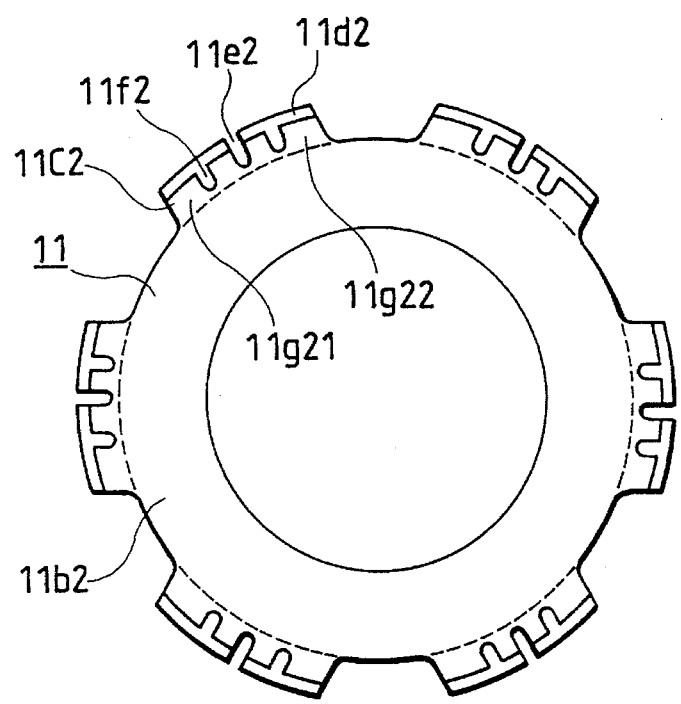
FIG. 4 is an enlarged front view showing a right side plate member of the bobbin, before the installation of the bobbin.
Figure 5:
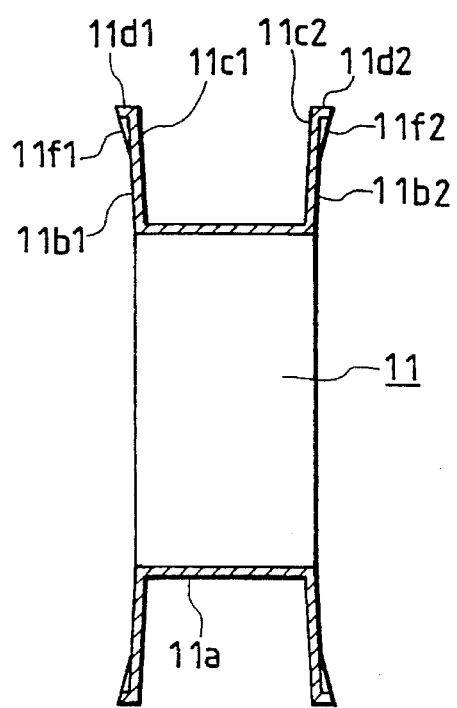
FIG. 5 is a cross-sectional view showing the bobbin, before the installation of the bobbin.

As seen in FIGS. 3–5, the bobbin 11 mainly comprises a cylindrical portion 11a, a left side plate member 11b1, a right side plate member 11b2, plural (6) left side thin plate projecting portions 11c1 integrally provided on the left side plate member 11b1 and plural (6) right side thin plate projecting portions 11c2 integrally provided on the right side plate member 11b2. The number of the thin plate projecting portions 11c1 and 11c2 coincide with the corresponding number of the magnetic poles 8a and 9a of the core rotors 8 and 9.

All of the cylindrical portion 11a, the left side plate member 11b1, the right side plate member 11b2, the left side thin plate projecting portions 11c1 and the right side thin plate projecting portions 11c2 of the bobbin 11 are formed integrally by a processing using a synthetic resin material.

Namely, the left side thin plate projecting portions 11c1 of the bobbin 11 are formed integrally to extend and project at an outer periphery of an end face from the left side plate member 11b1 toward a radial direction of the bobbin 11, as shown in FIG. 3. The right side thin plate projecting portions 11c2 are formed integrally to extend and project at an outer periphery of an end face from the right side plate member 11b2 toward a radial direction of the bobbin 11, as shown in FIG. 4.

In FIG. 3 and FIG. 4, each of the thin plate projecting portions 11c1 and 11c2 is folded inwardly at dotted line portions with a clearance formed between the respective claw-shaped magnetic poles 8a of the rotor core 8 and the respective claw-shaped magnetic poles 9a of the rotor core 9 and the magnetic field coil 10.

Figure 2:
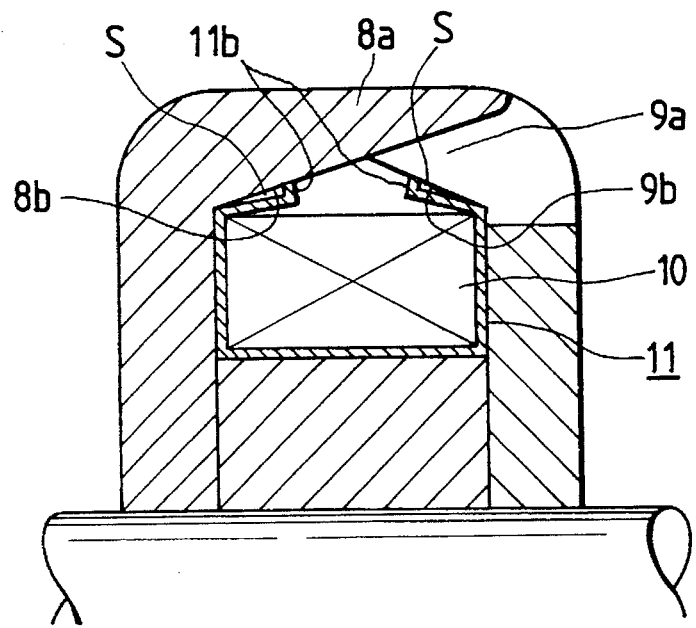
FIG. 2 is an enlarged cross-sectional view showing an essential portion around the rotor structure of FIG. 1.

Each of the left side thin plate projecting portions 11c1 formed in the left side plate member 11b1 of the bobbin 11 is arranged oppositely to the inner face of the respective claw-shaped magnetic poles 8a of the rotor core 8. Further, each of the left side thin plate projecting portions 11c1 formed in the left side plate member 11b1 of the bobbin 11 is positioned at an intermediate portion between the inner face of the respective claw-shaped magnetic poles 8a of the rotor core 8 and an outer peripheral face of the field magnetic coil 10, as shown in FIG. 2.

Each of the right side thin plate projecting portions 11c2 formed in the right side plate member 11b2 is arranged oppositely to the inner face of the respective claw-shaped magnetic poles 9a of the rotor core 9. Further, each of the right side thin plate projecting portions 11c2 is positioned at an intermediate portion between the inner face of the respective claw-shaped magnetic poles 9a of the rotor core 9 and an outer peripheral face of the field magnetic coil 10, as shown in FIG. 2.

Taking a view from the left side face of the bobbin 11, each of the left side thin plate projecting portions 11c1 formed in the left side plate member 11b1 is positioned at an intermediate portion formed between two adjacent right side thin plate projecting portions 11c2 formed in the right side plate member 11b2.

Each of the left side thin plate projecting portions 11c1 comprises two circumferential ribs 11d1, a slit portion 11e1 and two substantially radial direction extending reinforcement ribs 11f1 having triangular cross-sections. Each of the two reinforcement ribs 11f1 is formed to continue to each inner face of the circumferential ribs 11d1 and is extended to incline toward a root portion of the left side plate member 11b1 of the bobbin 11, as shown in FIG. 3.

Similarly, each of the right side thin plate projecting portions 11c2 comprises two circumferential ribs 11d2, a slit portion 11e2 and two substantially radial direction extending reinforcement ribs 11f2 having triangular cross-sections. Each of the two reinforcement ribs 11f2 is formed to continue to each inner face of the circumferential ribs 11d2 and is extended to incline toward a root portion of the right side plate member 11b2 of the bobbin 11, as shown in FIG. 4.

Accordingly, in a case where the bobbin 11 having the left side thin plate projecting portions 11c1 is incorporated into a rotor structure, the outer surface of the circumferential rib 11d1 and the outer inclined or sloped face of the reinforcement rib 11f1 contact the inner face of a claw-shaped magnetic pole 8a of the rotor core 8.

In other words, each of the left side thin plate projecting portions 11c1 of the left side plate member 11b1 of the bobbin 11 is positioned to extend from a root portion 8b of each of the claw-shaped magnetic poles 8a of the rotor core 8 toward the direction of a tip portion of each of the claw-shaped magnetic poles 8a of the rotor core 8.

Then, the spaces s shown in FIG. 2 are formed between the inner face of the respective claw-shaped magnetic pole 8a of the rotor core 8 and the respective left side thin plate projecting portion 11c1 of the bobbin 11.

Similarly, in a case where the bobbin 11 having the right side thin plate projecting portions 11c2 is incorporated into the rotor structure, the outer surface of the circumferential rib 11d2 and the outer inclined or sloped face of the reinforcement rib 11f2 contact the inner face of the claw-shaped magnetic pole 9a of the rotor core 9.

In other words, each of the right side thin plate projecting portions 11c2 of the right side plate member 11b2 of the bobbin 11 is positioned to extend from a root portion 9b of each of the claw-shaped magnetic poles 9a of the rotor core 9 toward the direction of a tip portion of each of the claw-shaped magnetic poles 9a of the rotor core 9.

Then, the spaces s shown in FIG. 2 are formed between the inner face of the respective claw-shaped magnetic pole 9a of the rotor core 9 and the respective left side thin plate projecting portion 11c2 of the bobbin 11.

The bobbin 11 wound around the field magnetic coil 10 is arranged between the rotor cores 8 and 9. The bobbin 11 is designed to receive a varnish processing, wherein varnish material is infused between the spaces s which are formed by the thin plate projecting portions 11c1 and 11c2 of the bobbin 11 and the field magnetic coil 10.

As a result, as shown in FIG. 2, the varnish material is caused to adhere to and become hardened at a vicinity of the root portion 8b of the claw-shaped magnetic pole 8a of the rotor core 8 and also at a vicinity of the root portion 9b of the claw-shaped magnetic pole 9a of the rotor core 9.

The operation of the alternating current generator for use in a vehicle constituted by the above stated rotor structure will be explained in the following.

The field magnetic current flows to the field magnetic coil 10 through the brush member 18 and the slip ring 16. At the same time, a driving force is transmitted to the pulley 12 through the engine (not shown in the figure) of the vehicle, and accordingly a rotation magnetic field is generated at the rotor cores 8 and 9.

By crossing this rotational magnetic field to the stator coil 3, the stator coil 3 can receive electromagnetic induction and an alternating current output is generated by the alternating current generator.

The alternating current output generated in the stator coil 3 flows into the diode bridge 20 through a coil terminal line and is full-wave rectified and further is converted to a direct current output.

At this time, since the output voltage of the alternative current generator is changed due to the rotational number, a field magnetic current is applied to the conductor and to the shielding by the regulator 19. Thereby, the generated voltage of the alternating current generator is controlled at constant level.

Further, the varnish material between the thin plate projecting portions 11c1 and 11c2 of the bobbin 11 and the claw-shaped magnetic poles 8a of the rotor core 8 and the claw-shaped magnetic poles 9a of the rotor core 9 inhibits any resonance vibration generated from the claw-shaped magnetic poles 8a of the rotor core 8 and the claw-shaped magnetic poles 9a of the rotor core 9.

Consequently, an unevenness of the air gap formed at the portion between the rotor cores 8 and 9 and the stator core 4 can be avoided, and so the magnetic noise can be reduced.

Further, since the slit portions 11e1 and 11e2 are provided on a central portion of the thin plate projecting portions 11c1 and 11c2 of the bobbin 11, each of the thin plate projecting portions 11c1 and 11c2 of the bobbin 11 is divided into two parts 11g11 and 11g12 and two parts 11g21 and 11g22, as shown in FIG. 3 and FIG. 4.

The local stress caused by twist can be dispersed toward the two parts 11g11 and the 11g12 and two parts 11g21 and 11g22 of each of the thin plate projecting portions 11c1 and 11c2 of the bobbin 11, the above stated twist being generated during the working operation for installing the bobbin 11.

Accordingly, the occurrences of a crack and other damage to the thin plate projecting portions 11c1 and 11c2 of the bobbin 11 can be prevented and the working property for installing the bobbin 11 can be improved.

Figure 6:
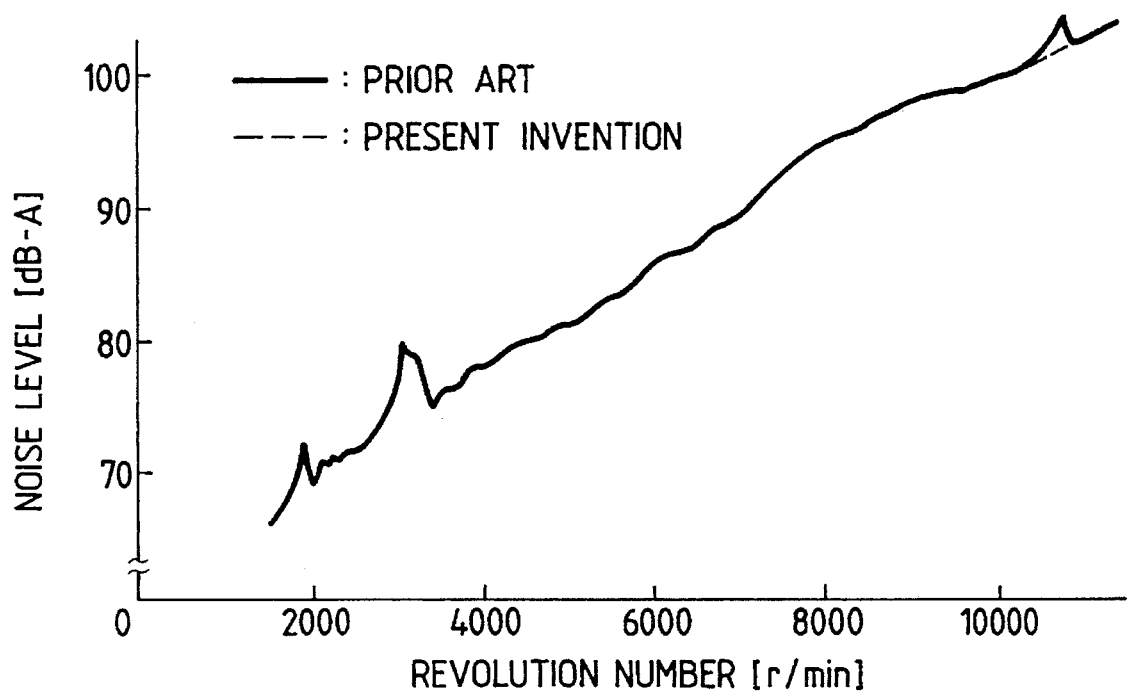
FIG. 6 is a noise comparison characteristic graph according to the present invention and according to the prior art.
Figure 7:
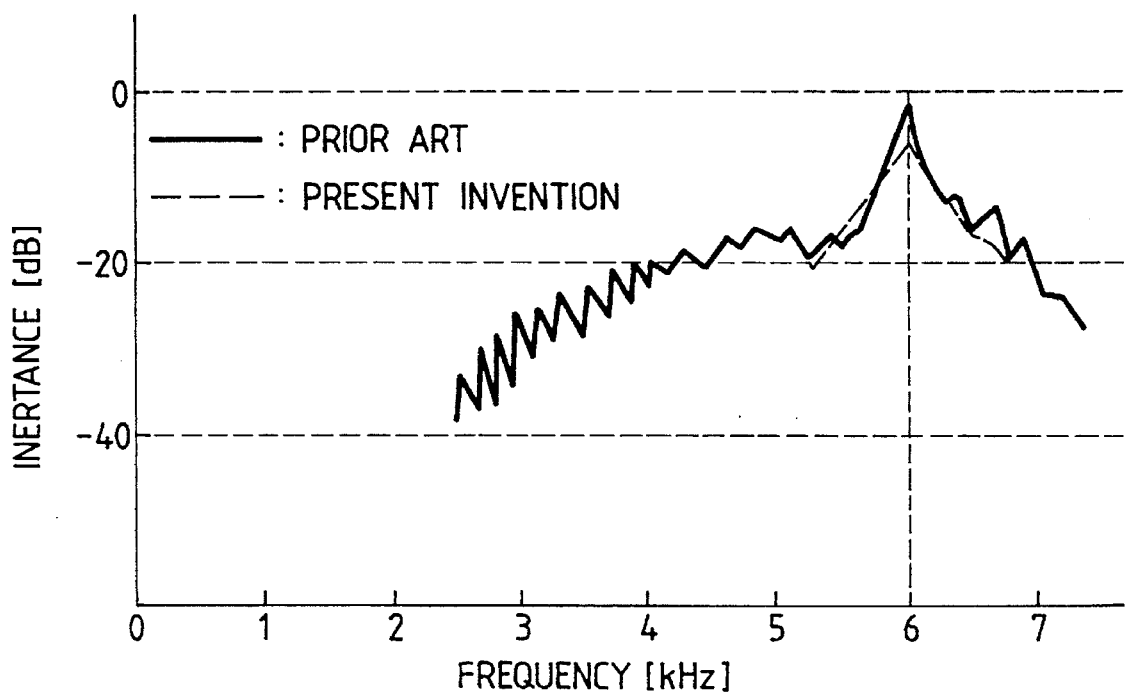
FIG. 7 is an inertance comparison characteristic graph according to the present invention and according to the prior art.

FIG. 6 and FIG. 7 show the magnetic noise and the inertance (the transmission function result) according to the prior art and according to the present invention.

As shown in FIG. 6, with respect to the magnetic noise, in the prior art shown by a solid line, a peak value occurs at the rotational number of about 10,000 r/min; however, in the bobbin according to the present invention shown by the dotted line, no peak value is seen in the rotational number of about 10,000 r/min.

Further, as shown in FIG. 7, with respect to the inertance of the claw-shaped magnetic pole of the rotor core, an equal effect to that of the bobbin structure, which is wound on the whole outer peripheral portion by a vibration ring for preventing an opening of the claw-shaped magnetic poles of the rotor cores, can be obtained, while the resonance vibration of the claw shape magnetic pole of the rotor core also can be restrained.

Namely, as shown in FIG. 7, in the prior art shown by a solid line, a high peak value is seen at the frequency of about 6 kHz; however, in the frequency of about 6 kHz of the bobbin according to the present invention, shown by a dotted line, such a high peak value in the prior art is reduced.

According to the present invention, since the hardened adhesive material adheres to the plural claw-shaped magnetic poles of the rotor cores through the bobbin, the resonance vibration of the rotor core can be reduced and also the resonance vibration of the rotor core, which represents the main factor of magnetic noise, can be restrained.

As a result, a rotor structure for the alternating current generator, for use in a vehicle, having a small magnetic noise can be obtained.

We claim:

1. A rotor structure of an alternating current generator for use in a vehicle comprises:
    a rotative support shaft;
    a pair of rotor cores fixed to and oppositely arranged on said shaft, and each of said pair of rotor cores respectively having plural claw-shaped magnetic poles;
    a field magnetic coil sandwiched by said pair of rotor cores; and
    a bobbin made of a synthetic resin material for insulating said pair of rotor cores from said field magnetic coil, said bobbin comprising:
    (i) a cylindrical portion and two side plate members integrally formed with said cylindrical portion;
    (ii) plural thin plate projecting portions provided integrally on an outer peripheral portion of each of said two side plate members, said plural thin plate projecting portions of said bobbin being arranged oppositely to said plural claw-shaped magnetic poles, and each of said plural thin plate projecting portions extending from a root portion of said plural claw-shaped magnetic poles of said pair of rotor cores toward a direction of a tip portion of said plural claw-shaped magnetic poles of said pair of rotor cores; and
    (iii) an adhesive material disposed on said bobbin on one side of said thin plate projecting portions so as to cause said field magnetic coil and said bobbin to adhere to each other and also on the other side of said thin plate projecting portions so as to cause said bobbin and said pair of rotor cores to adhere to each other;
    wherein each of said plural thin plate projecting portions of said bobbin is disposed at an intermediate position in the space formed between said inner face of each of said plural claw-shaped magnetic poles of said pair of rotor cores and an outer peripheral face of said field magnetic coil, so that adhesive material retaining spaces are provided on both sides of said thin plate projecting portions.

2. A rotor structure of an alternating current generator for use in a vehicle comprises:
    a rotative support shaft;
    a pair of rotor cores fixed to and oppositely arranged on said shaft, and each of said pair of rotor cores respectively having plural claw-shaped magnetic poles;
    a field magnetic coil sandwiched by said pair of rotor cores; and
    a bobbin made of a synthetic resin material for insulating said pair of rotor cores from said field magnetic coil, said bobbin comprising:
    (i) a cylindrical portion and two side plate members integrally formed with said cylindrical portion;
    (ii) plural thin plate projecting portions provided integrally on an outer peripheral portion of each of said two side plate members, said plural thin plate projecting portions of said bobbin being arranged oppositely to said plural claw-shaped magnetic poles, and each of said plural thin plate projecting portions extending from a root portion of said plural claw-shaped magnetic poles of said pair of rotor cores toward a direction of a tip portion of said plural claw-shaped magnetic poles of said pair of rotor cores; and
    (iii) an adhesive material disposed on said bobbin on one side of said thin plate projecting portions so as to cause said field magnetic coil and said bobbin to adhere to each other and also on the other side of said thin plate projecting portions so as to cause said bobbin and said pair of rotor cores to adhere to each other;
    wherein each of said plural thin plate projecting portions of said bobbin has at least one circumferential rib at an outer peripheral portion of each of said plural thin plate projecting portions, which circumferential rib is in contact with an inner surface of said claw-shaped magnetic poles.

3. A rotor structure of an alternating current generator for use in a vehicle comprises:
    a rotative support shaft;
    a pair of rotor cores fixed to and oppositely arranged on said shaft, and each of said pair of rotor cores respectively having plural claw-shaped magnetic poles;
    a field magnetic coil sandwiched by said pair of rotor cores; and
    a bobbin made of a synthetic resin material for insulating said pair of rotor cores from said field magnetic coil, said bobbin comprising:
    (i) a cylindrical portion and two side plate members integrally formed with said cylindrical portion;
    (ii) plural thin plate projecting portions provided integrally on an outer peripheral portion of each of said two side plate members, said plural thin plate projecting portions of said bobbin being arranged oppositely to said plural claw-shaped magnetic poles, and each of said plural thin plate projecting portions extending from a root portion of said plural claw-shaped magnetic poles of said pair of rotor cores toward a direction of a tip portion of said plural claw-shaped magnetic poles of said pair of rotor cores; and
    (iii) an adhesive material disposed on said bobbin on one side of said thin plate projecting portions so as to cause said field magnetic coil and said bobbin to adhere to each other and also on the other side of said thin plate projecting portions so as to cause said bobbin and said pair of rotor cores to adhere to each other;
    wherein each of said plural thin plate projecting portions of said bobbin is of substantially the same thickness as said side plate members and has at least one reinforcement rib, said at least one reinforcement rib projecting toward a radial direction of said bobbin.

4. A rotor structure of an alternating current generator for use in a vehicle according to claim 3, wherein said at least one reinforcement rib is formed with a sloped outer shape so as to incline toward a substantially radial direction of said bobbin.

5. A rotor structure of an alternating current generator for use in a vehicle comprises:
    a rotative support shaft;
    a pair of rotor cores fixed to and oppositely arranged on said shaft, and each of said pair of rotor cores respectively having plural claw-shaped magnetic poles;

a field magnetic coil sandwiched by said pair of rotor cores; and a bobbin made of a synthetic resin material for insulating said pair of rotor cores from said field magnetic coil, said bobbin comprising:

(i) a cylindrical portion and two side plate members integrally formed with said cylindrical portion;

(ii) plural thin plate projecting portions provided integrally on an outer peripheral portion of each of said two side plate members, said plural thin plate projecting portions of said bobbin being arranged oppositely to said plural claw-shaped magnetic poles, and each of said plural thin plate projecting portions extending from a root portion of said plural claw-shaped magnetic poles of said pair of rotor cores toward a direction of a tip portion of said plural claw-shaped magnetic poles of said pair of rotor cores; and (iii) an adhesive material disposed on said bobbin on one side of said thin plate projecting portions so as to cause said field magnetic coil and said bobbin to adhere to each other and also on the other side of said thin plate projecting portions so as to cause said bobbin and said pair of rotor cores to adhere to each other, wherein:

each of said plural thin plate projecting portions of said bobbin has at least one circumferential rib at an outer peripheral portion of each of said plural thin plate projecting portions, which circumferential rib is in contact with an inner surface of said claw-shaped magnetic poles; and each of said plural thin plate projecting portions of said bobbin has at least one reinforcement rib, said at least one reinforcement rib being disposed so as to project from an inner face of said at least one circumferential rib of each of said plural thin plate projecting portions toward a radial direction of said bobbin.

6. A rotor structure of an alternating current generator for use in a vehicle comprises:

a rotative support shaft;

a pair of rotor cores fixed to and oppositely arranged on said shaft, and each of said pair of rotor cores respectively having plural claw-shaped magnetic poles;

a field magnetic coil sandwiched by said pair of rotor cores; and a bobbin made of a synthetic resin material for insulating said pair of rotor cores from said field magnetic coil, said bobbin comprising:

(i) a cylindrical portion and two side plate members integrally formed with said cylindrical portion;

(ii) plural thin plate projecting portions provided integrally on an outer peripheral portion of each of said two side plate members, said plural thin plate projecting portions of said bobbin being arranged oppositely to said plural claw-shaped magnetic poles, and each of said plural thin plate projecting portions extending from a root portion of said plural claw-shaped magnetic poles of said pair of rotor cores toward a direction of a tip portion of said plural claw-shaped magnetic poles of said pair of rotor cores; and (iii) an adhesive material disposed on said bobbin so as to cause said field magnetic coil and said bobbin to adhere to each other and also said bobbin and said pair of rotor cores to adhere to each other, wherein each of said plural thin plate projecting portions of said bobbin has at least one slit portion, and each of said plural thin plate projecting portions of said bobbin is divided through said at least one slit portion, and said at least one slit portion extends toward a radial direction of said bobbin.

7. A rotor structure of an alternating current generator for use in a vehicle comprises:

a rotative support shaft;

a left side rotor core fixed to and arranged on said shaft and having an even plural number of claw-shaped magnetic poles;

a right side rotor core fixed to and arranged on said shaft and having an even plural number of claw-shaped magnetic poles, said left side rotor core and said right side rotor core being fixed to and oppositely arranged on said shaft;

a field magnetic coil sandwiched by said left side rotor core and said right side rotor core; and a bobbin made of a synthetic resin material for insulating said left side rotor core, said right side rotor core and said field magnetic coil, said bobbin comprising:

(i) a cylindrical portion, and a left side plate member integrally formed with said cylindrical portion and a right side plate member integrally formed with said cylindrical portion;

(ii) left side plural thin plate projecting portions provided integrally on an outer peripheral portion of said left side plate member, and right side plural thin plate projecting portions provided integrally on an outer peripheral portion of said right side plate member, wherein (a) each of said left side plural thin plate projecting portions of said bobbin is arranged oppositely to correspond to each of said left side plural claw-shaped magnetic poles of said left side rotor core, each of said left side plural thin plate projecting portions extends from a root portion of each of said left side plural claw-shaped magnetic poles of said left side rotor core toward a direction of a tip portion of each of said left side plural claw-shaped magnetic poles of said left side rotor core, said left side plural thin plate projecting portions are provided in the same even number as said left side plural claw-shaped magnetic poles of said left side rotor core; and wherein (b) each of said right side plural thin plate projecting portions of said bobbin is arranged oppositely to correspond to each of said right side plural claw-shaped magnetic poles of said right side rotor core, each of said right side plural thin plate projecting portions extends from a root portion of each of said right side plural claw-shaped magnetic poles of said right side rotor core toward a direction of a tip portion of each of said right side plural claw-shaped magnetic poles of said right side rotor core, said right side plural thin plate projecting portions are provided in the same even number as said right side plural claw-shaped magnetic poles of said right side rotor core; and (iii) an adhesive material disposed on said bobbin on one side of each of said thin plate projecting portions so as to cause said field magnetic coil and said bobbin to adhere to each other and also on the other side of each of said thin plate projecting portions so as to cause said bobbin, said left side rotor core and said right side rotor core to adhere to each other, wherein:

each of said left side plural thin plate projecting portions of said bobbin is disposed at an intermediate position in the space formed between said inner face of each of said left side plural claw-shaped magnetic poles of said left side rotor core and an outer peripheral face of said field magnetic coil, so that an adhesive retaining space is provided therebetween; and each of said right side plural thin plate projecting portions of said bobbin is disposed at an intermediate position in the space formed between said inner face of each of said right side plural claw-shaped magnetic poles of said right side rotor core and an outer peripheral face of said field magnetic coil, so that an adhesive retaining space is provided therebetween.

8. A rotor structure of an alternating current generator for use in a vehicle comprises:

a rotative support shaft;

a left side rotor core fixed to and arranged on said shaft and having an even plural number of claw-shaped magnetic poles;

a right side rotor core fixed to and arranged on said shaft and having an even plural number of claw-shaped magnetic poles, said left side rotor core and said right side rotor core being fixed to and oppositely arranged on said shaft;

a field magnetic coil sandwiched by said left side rotor core and said right side rotor core; and a bobbin made of a synthetic resin material for insulating said left side rotor core, said right side rotor core and said field magnetic coil, said bobbin comprising:

(i) a cylindrical portion, and a left side plate member integrally formed with said cylindrical portion and a right side plate member integrally formed with said cylindrical portion;

(ii) left side plural thin plate projecting portions provided integrally on an outer peripheral portion of said left side plate member, and right side plural thin plate projecting portions provided integrally on an outer peripheral portion of said right side plate member, wherein (a) each of said left side plural thin plate projecting portions of said bobbin is arranged oppositely to correspond to each of said left side plural claw-shaped magnetic poles of said left side rotor core, each of said left side plural thin plate projecting portions extends from a root portion of each of said left side plural claw-shaped magnetic poles of said left side rotor core toward a direction of a tip portion of each of said left side plural claw-shaped magnetic poles of said left side rotor core, said left side plural thin plate projecting portions are provided in the same even number as said left side plural claw-shaped magnetic poles of said left side rotor core; and wherein (b) each of said right side plural thin plate projecting portions of said bobbin is arranged oppositely to correspond to each of said right side plural claw-shaped magnetic poles of said right side rotor core, each of said right side plural thin plate projecting portions extends from a root portion of each of said right side plural claw-shaped magnetic poles of said right side rotor core toward a direction of a tip portion of each of said right side plural claw-shaped magnetic poles of said right side rotor core, said right side plural thin plate projecting portions are provided in the same even number as said right side plural claw-shaped magnetic poles of said right side rotor core; and (iii) an adhesive material disposed on said bobbin on one side of each of said thin plate projecting portions so as to cause said field magnetic coil and said bobbin to adhere to each other and also on the other side of each of said thin plate projecting portions so as to cause said bobbin, said left side rotor core and said right side rotor core to adhere to each other, wherein:

each of said left side plural plate projecting portions of said bobbin has two left side circumferential ribs at an outer peripheral portion of each of said left side plural thin plate projecting portions; and each of said right side plural plate projecting portions of said bobbin has two right side circumferential ribs at an outer peripheral portion of each of said right side plural thin plate projecting portions.

9. A rotor structure of an alternating current generator for use in a vehicle comprises:

a rotative support shaft;

a left side rotor core fixed to and arranged on said shaft and having an even plural number of claw-shaped magnetic poles;

a right side rotor core fixed to and arranged on said shaft and having an even plural number of claw-shaped magnetic poles, said left side rotor core and said right side rotor core being fixed to and oppositely arranged on said shaft;

a field magnetic coil sandwiched by said left side rotor core and said right side rotor core; and a bobbin made of a synthetic resin material for insulating said left side rotor core, said right side rotor core and said field magnetic coil, said bobbin comprising:

(i) a cylindrical portion, and a left side plate member integrally formed with said cylindrical portion and a right side plate member integrally formed with said cylindrical portion;

(ii) left side plural thin plate projecting portions provided integrally on an outer peripheral portion of said left side plate member, and right side plural thin plate projecting portions provided integrally on an outer peripheral portion of said right side plate member, wherein (a) each of said left side plural thin plate projecting portions of said bobbin is arranged oppositely to correspond to each of said left side plural claw-shaped magnetic poles of said left side rotor core, each of said left side plural thin plate projecting portions extends from a root portion of each of said left side plural claw-shaped magnetic poles of said left side rotor core toward a direction of a tip portion of each of said left side plural claw-shaped magnetic poles of said left side rotor core, said left side plural thin plate projecting portions are provided in the same even number as said left side plural claw-shaped magnetic poles of said left side rotor core; and wherein (b) each of said right side plural thin plate projecting portions of said bobbin is arranged oppositely to correspond to each of said right side plural claw-shaped magnetic poles of said right side rotor core, each of said right side plural thin plate projecting portions extends from a root portion of each of said right side plural claw-shaped magnetic poles of said right side rotor core toward a direction of a tip portion of each of said right side plural claw-shaped magnetic poles of said right side rotor core, said right side plural thin plate projecting portions are provided in the same even number as said right side plural claw-shaped magnetic poles of said right side rotor core; and (iii) an adhesive material disposed on said bobbin on one side of each of said thin plate projecting portions so as to cause said field magnetic coil and said bobbin to adhere to each other and also on the other side of each of said thin plate projecting portions so as to cause said bobbin, said left side rotor core and said right side rotor core to adhere to each other, wherein:

each of said left side plural thin plate projecting portions of said bobbin has two left side reinforcement ribs, each of said two left side reinforcement ribs projecting toward a radial direction of said bobbin; and each of said right side plural thin plate projecting portions of said bobbin has two right side reinforcement ribs, each of said two right side reinforcement ribs projecting toward a radial direction of said bobbin.

10. A rotor structure of an alternating current generator for use in a vehicle according to claim 9, wherein:

each of said two left side reinforcement ribs is formed with a sloped outer shape so as to incline toward a substantially radial direction of said bobbin; and each of said two right side reinforcement ribs is formed with a sloped outer shape so as to incline toward a substantially radial direction of said bobbin.

11. A rotor structure of an alternating current generator for use in a vehicle comprises:

a rotative support shaft;

a left side rotor core fixed to and arranged on said shaft and having an even plural number of claw-shaped magnetic poles;

a right side rotor core fixed to and arranged on said shaft and having an even plural number of claw-shaped magnetic poles, said left side rotor core and said right side rotor core being fixed to and oppositely arranged on said shaft;

a field magnetic coil sandwiched by said left side rotor core and said right side rotor core; and a bobbin made of a synthetic resin material for insulating said left side rotor core, said right side rotor core and said field magnetic coil, said bobbin comprising:

(i) a cylindrical portion, and a left side plate member integrally formed with said cylindrical portion and a right side plate member integrally formed with said cylindrical portion;

(ii) left side plural thin plate projecting portions provided integrally on an outer peripheral portion of said left side plate member, and right side plural thin plate projecting portions provided integrally on an outer peripheral portion of said right side plate member, wherein (a) each of said left side plural thin plate projecting portions of said bobbin is arranged oppositely to correspond to each of said left side plural claw-shaped magnetic poles of said left side rotor core, each of said left side plural thin plate projecting portions extends from a root portion of each of said left side plural claw-shaped magnetic poles of said left side rotor core toward a direction of a tip portion of each of said left side plural claw-shaped magnetic poles of said left side rotor core, said left side plural thin plate projecting portions are provided in the same even number as said left side plural claw-shaped magnetic poles of said left side rotor core; and wherein (b) each of said right side plural thin plate projecting portions of said bobbin is arranged oppositely to correspond to each of said right side plural claw-shaped magnetic poles of said right side rotor core, each of said right side plural thin plate projecting portions extends from a root portion of each of said right side plural claw-shaped magnetic poles of said right side rotor core toward a direction of a tip portion of each of said right side plural claw-shaped magnetic poles of said right side rotor core, said right side plural thin plate projecting portions are provided in the same even number as said right side plural claw-shaped magnetic poles of said right side rotor core; and (iii) an adhesive material disposed on said bobbin on one side of each of said thin plate projecting portions so as to cause said field magnetic coil and said bobbin to adhere to each other and also on the other side of each of said thin plate projecting portions so as to cause said bobbin, said left side rotor core and said right side rotor core to adhere to each other, wherein:

each of said left side plural thin plate projecting portions of said bobbin has two left side circumferential ribs at an outer peripheral portion of each of said left side plural thin plate projecting portions, and each of said left side plural thin plate projecting portions of said bobbin has two left side reinforcement ribs; and each of said right side plural thin plate projecting portions of said bobbin has two right side circumferential ribs at an outer peripheral portion of each of said right side plural thin plate projecting portions, and each of said right side plural thin plate projecting portions of said bobbin has two right side reinforcement ribs; and wherein:

each of said two left side reinforcement ribs projects from an inner face of each of said two left side circumferential ribs of each of said left side plural thin plate projecting portions toward a radial direction of said bobbin; and each of said two right side reinforcement ribs projects from an inner face of each of said right side two circumferential ribs of each of said right side plural thin plate projecting portions toward a radial direction of said bobbin.

12. A rotor structure of an alternating current generator for use in a vehicle comprises:

a rotative support shaft;

a left side rotor core fixed to and arranged on said shaft and having an even plural number of claw-shaped magnetic poles;

a right side rotor core fixed to and arranged on said shaft and having an even plural number of claw-shaped magnetic poles, said left side rotor core and said right side rotor core being fixed to and oppositely arranged on said shaft;

a field magnetic coil sandwiched by said left side rotor core and said right side rotor core; and a bobbin made of a synthetic resin material for insulating said left side rotor core, said right side rotor core and said field magnetic coil, said bobbin comprising:

(i) a cylindrical portion, and a left side plate member integrally formed with said cylindrical portion and a right side plate member integrally formed with said cylindrical portion;

(ii) left side plural thin plate projecting portions provided integrally on an outer peripheral portion of said left side plate member, and right side plural thin plate projecting portions provided integrally on an outer peripheral of said right side plate member, wherein (a) each of said left side plural thin plate projecting portions of said bobbin is arranged oppositely to correspond to each of said left side plural claw-shaped magnetic poles of said left side rotor core, each of said left side plural thin plate projecting portions extends from a root portion of each of said left side plural claw-shaped magnetic poles of said left side rotor core toward a direction of a tip portion of each of said left side plural claw-shaped magnetic poles of said left side rotor core, said left side plural thin plate projecting portions are provided in the same even number as said left side plural claw-shaped magnetic poles of said left side rotor core; and wherein (b) each of said right side plural thin plate projecting portions of said bobbin is arranged oppositely to correspond to each of said right side plural claw-shaped magnetic poles of said right side rotor core, each of said right side plural thin plate projecting portions extends from a root portion of each of said right side plural claw-shaped magnetic poles of said right side rotor core toward a direction of a tip portion of each of said right side plural claw-shaped magnetic poles of said right side rotor core, said right side plural thin plate projecting portions are provided in the same even number as said right side plural claw-shaped magnetic poles of said right side rotor core; and (iii) an adhesive material disposed on said bobbin so as to cause said field magnetic coil and said bobbin to adhere to each other and also said bobbin, said left side rotor core and said right side rotor core to adhere to each other, wherein:

each of said left side plural thin plate projecting portions of said bobbin has one left side slit portion, and each of said left side plural thin plate projecting portions of said bobbin is divided through said left side slit portion, and said left side slit portion extends toward a radial direction of said bobbin; and each of said right side plural thin plate projecting portions of said bobbin has one right side slit portion, and each of said right side plural thin plate projecting portions of said bobbin is divided through said right side slit portion, and said right side slit portion extends toward a radial direction of said bobbin.

\* \* \* \* \*